United States Patent
Crank

(10) Patent No.: US 12,193,452 B2
(45) Date of Patent: Jan. 14, 2025

(54) METHODS OF SEPARATING FAT FROM NON-SOY PLANT MATERIALS AND COMPOSITIONS PRODUCED THEREFROM

(71) Applicant: Specialty Protein Producers, Inc., North Sioux City, SD (US)

(72) Inventor: Donald L. Crank, North Sioux City, SD (US)

(73) Assignee: Specialty Protein Producers, Inc., North Sioux City, SD (US)

( * ) Notice: Subject to any disclaimer, the term of this patent is extended or adjusted under 35 U.S.C. 154(b) by 0 days.

(21) Appl. No.: 16/352,253

(22) Filed: Mar. 13, 2019

(65) Prior Publication Data

US 2019/0208796 A1    Jul. 11, 2019

Related U.S. Application Data

(60) Division of application No. 13/543,405, filed on Jul. 6, 2012, now Pat. No. 10,555,542, which is a
(Continued)

(51) Int. Cl.
*A23C 11/10* (2021.01)
*A21D 2/26* (2006.01)
(Continued)

(52) U.S. Cl.
CPC .......... *A23C 11/103* (2013.01); *A21D 2/266* (2013.01); *A21D 13/064* (2013.01); *A23C 9/133* (2013.01);
(Continued)

(58) Field of Classification Search
CPC ............ A23V 2300/14; A23V 2250/21; A23V 2250/548; A23V 2250/54; A23J 1/14;
(Continued)

(56) References Cited

U.S. PATENT DOCUMENTS 2,101,371 A    12/1937 Lava
2,489,208 A    11/1949 Turner
(Continued)

FOREIGN PATENT DOCUMENTS

CN    1615722    5/2005
CN    1740189    3/2006
(Continued)

OTHER PUBLICATIONS

Callaway, J.C. "Hempseed as a nutritional resource: an overview", Euphytica, Jan. 2004, vol. 140, Issue 1-2, pp. 65-72 https://www.keyleafhemp.com/news-insights/the-hemp-seed (Year: 2004).*
(Continued)

*Primary Examiner* — Hong T Yoo
(74) *Attorney, Agent, or Firm* — Quarles & Brady, LLP

(57) ABSTRACT

Disclosed are methods for separating non-soy plant materials to produce a fat-enriched fraction, a reduced-fat plant extract, reduced-fat plant protein compositions, a crude oil, plant gums, a degummed oil and a protein-fat sediment. Also disclosed are food products containing or prepared from the reduced-fat extracts, fat-enriched fraction, gums, oils, protein-fat sediments and reduced-fat protein compositions.

19 Claims, 4 Drawing Sheets

Related U.S. Application Data continuation of application No. 13/154,054, filed on Jun. 6, 2011, now abandoned, which is a continuation of application No. 11/681,217, filed on Mar. 2, 2007, now abandoned.

(60) Provisional application No. 60/778,802, filed on Mar. 3, 2006.

(51) Int. Cl.

| | | |
|---|---|---|
| *A21D 13/064* | (2017.01) | |
| *A23C 9/133* | (2006.01) | |
| *A23C 11/06* | (2006.01) | |
| *A23C 20/00* | (2006.01) | |
| *A23G 1/44* | (2006.01) | |
| *A23G 9/38* | (2006.01) | |
| *A23J 1/00* | (2006.01) | |
| *A23J 1/12* | (2006.01) | |
| *A23J 1/14* | (2006.01) | |
| *A23L 2/39* | (2006.01) | |
| *A23L 2/66* | (2006.01) | |
| *A23L 7/126* | (2016.01) | |
| *A23L 11/00* | (2021.01) | |
| *A23L 11/60* | (2021.01) | |
| *A23L 13/40* | (2023.01) | |
| *A23L 13/60* | (2016.01) | |
| *A23L 17/00* | (2016.01) | |
| *A23L 33/00* | (2016.01) | |
| *A23L 33/185* | (2016.01) | |
| *C11B 1/14* | (2006.01) | |

(52) U.S. Cl.
CPC .............. *A23C 11/06* (2013.01); *A23C 20/00* (2013.01); *A23G 1/44* (2013.01); *A23G 9/38* (2013.01); *A23J 1/006* (2013.01); *A23J 1/007* (2013.01); *A23J 1/12* (2013.01); *A23J 1/14* (2013.01); *A23L 2/39* (2013.01); *A23L 2/66* (2013.01); *A23L 7/126* (2016.08); *A23L 11/07* (2016.08); *A23L 11/60* (2021.01); *A23L 13/426* (2016.08); *A23L 13/65* (2016.08); *A23L 13/67* (2016.08); *A23L 17/70* (2016.08); *A23L 33/185* (2016.08); *A23L 33/40* (2016.08); *C11B 1/14* (2013.01)

(58) Field of Classification Search
CPC ....... A23J 3/14; A23J 1/142; A23J 1/12; A23J 3/346; A23J 1/006; A23L 33/185; A23L 33/105; A23L 2/66; A23L 33/115; A23L 19/00; A23L 33/145; A23L 11/00
See application file for complete search history.

(56) References Cited

U.S. PATENT DOCUMENTS

| | | | |
|---|---|---|---|
| 3,317,325 A * | 5/1967 | Durst | A23L 25/10 |
| | | | 426/627 |
| 3,635,726 A | 1/1972 | Sair | |
| 3,809,767 A * | 5/1974 | Sair et al. | A23J 1/14 |
| | | | 426/629 |
| 3,897,574 A | 7/1975 | Pass | |
| 3,966,982 A | 6/1976 | Becker et al. | |
| 3,995,071 A | 11/1976 | Goodnight, Jr. et al. | |
| 4,064,283 A * | 12/1977 | Saunders | A23J 1/205 |
| | | | 426/583 |
| 4,072,670 A | 2/1978 | Goodnight, Jr. et al. | |
| 4,091,120 A | 5/1978 | Goodnight, Jr. et al. | |
| 4,151,310 A | 4/1979 | Mattil et al. | |
| 4,172,828 A | 10/1979 | Davidson et al. | |
| 4,188,399 A | 2/1980 | Shemer | |
| 4,208,323 A | 6/1980 | Murray et al. | |
| 4,284,656 A | 8/1981 | Hwa | |
| 4,285,862 A | 8/1981 | Murray et al. | |
| 4,321,280 A | 3/1982 | Roy et al. | |
| 4,346,122 A | 8/1982 | Orthoefer et al. | |
| 4,361,081 A | 11/1982 | Howard | |
| 4,366,097 A | 12/1982 | Cameron et al. | |
| 4,368,151 A | 1/1983 | Howard et al. | |
| 4,410,554 A | 10/1983 | Sailer | |
| 4,420,425 A | 12/1983 | Lawhon | |
| 4,435,438 A | 3/1984 | Lehnhardt et al. | |
| 4,460,613 A | 7/1984 | Yang et al. | |
| 4,493,854 A | 1/1985 | Friedrich et al. | |
| 4,500,454 A | 2/1985 | Chang | |
| 4,530,788 A | 7/1985 | Chang | |
| 4,650,857 A * | 3/1987 | May | A23J 1/14 |
| | | | 426/430 |
| 4,697,004 A | 9/1987 | Puski et al. | |
| 4,859,482 A | 8/1989 | Gavin et al. | |
| 5,086,166 A | 2/1992 | Lawhon et al. | |
| 5,097,017 A | 3/1992 | Konwinski | |
| 5,152,897 A | 10/1992 | Shibuta et al. | |
| 5,290,959 A | 3/1994 | Rice | |
| 5,346,713 A | 9/1994 | Leader | |
| 5,674,548 A | 10/1997 | Nakamura et al. | |
| 5,760,182 A | 6/1998 | Adachi et al. | |
| 5,844,086 A | 12/1998 | Murray | |
| 5,858,449 A | 1/1999 | Crank et al. | |
| 5,936,069 A | 8/1999 | Johnson | |
| 6,005,076 A | 12/1999 | Murray | |
| 6,051,265 A | 4/2000 | Nakamura et al. | |
| 6,132,795 A | 10/2000 | Holbrook et al. | |
| 6,284,292 B1 | 9/2001 | Nielsen et al. | |
| 6,313,273 B1 | 11/2001 | Thomas et al. | |
| 6,335,043 B1 | 1/2002 | Jiang et al. | |
| 6,361,990 B1 | 3/2002 | Porter et al. | |
| 6,465,037 B1 | 10/2002 | Altemueller et al. | |
| 6,544,566 B1 | 4/2003 | Waggle et al. | |
| 6,548,102 B2 | 4/2003 | Fenske et al. | |
| 6,566,134 B2 | 5/2003 | Bringe | |
| 6,599,556 B2 | 7/2003 | Stark et al. | |
| 6,630,195 B1 | 10/2003 | Muralidhara et al. | |
| 6,653,451 B1 | 11/2003 | Kerr et al. | |
| 6,677,327 B1 | 1/2004 | Gottemoller | |
| 6,716,469 B2 | 4/2004 | Stark et al. | |
| 6,720,020 B2 | 4/2004 | Karleskind et al. | |
| 6,787,173 B2 | 9/2004 | Akashe et al. | |
| 6,797,288 B2 | 9/2004 | Monagle et al. | |
| 6,797,309 B2 | 9/2004 | Monagle | |
| 6,803,068 B2 | 10/2004 | Monagle et al. | |
| 6,811,798 B2 | 11/2004 | Monagle | |
| 6,818,246 B2 | 11/2004 | Singh | |
| 6,841,184 B2 | 1/2005 | Porter et al. | |
| 6,844,458 B2 | 1/2005 | Copeland et al. | |
| 6,992,173 B2 | 1/2006 | Milanova et al. | |
| 7,037,547 B2 | 5/2006 | Akashe et al. | |
| 7,045,163 B2 | 5/2006 | Akashe et al. | |
| 7,081,257 B2 | 7/2006 | Monagle et al. | |
| 7,083,819 B2 | 8/2006 | Singh | |
| 7,169,425 B2 | 1/2007 | Ruppe et al. | |
| 7,175,869 B2 | 2/2007 | Brown et al. | |
| 2001/0024666 A1 | 9/2001 | Waggle et al. | |
| 2001/0024677 A1 | 9/2001 | Bringe | |
| 2001/0026814 A1 | 10/2001 | Waggle et al. | |
| 2001/0029248 A1 | 10/2001 | Waggle et al. | |
| 2001/0041187 A1 | 11/2001 | Hastings et al. | |
| 2002/0039619 A1 | 4/2002 | Monagle | |
| 2002/0098276 A1 | 7/2002 | Porter et al. | |
| 2002/0102339 A1 | 8/2002 | Akashe et al. | |
| 2002/0106437 A1 | 8/2002 | Karleskind et al. | |
| 2002/0106440 A1 | 8/2002 | Porter et al. | |
| 2002/0114877 A1 | 8/2002 | Stark et al. | |
| 2002/0197384 A1 | 12/2002 | Singh | |
| 2003/0013852 A1 | 1/2003 | Sakata et al. | |
| 2003/0021881 A1 | 1/2003 | Friedman | |
| 2003/0054087 A1 | 3/2003 | Monagle et al. | |
| 2003/0059514 A1 | 3/2003 | Villagran et al. | |
| 2003/0072866 A1 * | 4/2003 | Higgs | A23L 33/115 |
| | | | 426/618 |

(56) References Cited

U.S. PATENT DOCUMENTS

| | | |
|---|---|---|
| 2003/0108591 A1 | 6/2003 | Meijer et al. |
| 2003/0125526 A1 | 7/2003 | Barker et al. |
| 2003/0129217 A1 | 7/2003 | Festo |
| 2003/0149243 A1 | 8/2003 | Murray et al. |
| 2003/0190401 A1 | 10/2003 | Singh |
| 2003/0211225 A1 | 11/2003 | Singh |
| 2003/0232121 A1 | 12/2003 | Monagle et al. |
| 2004/0013790 A1 | 1/2004 | Anderson |
| 2004/0013791 A1 | 1/2004 | Singh |
| 2004/0037905 A1 | 2/2004 | Bringe |
| 2004/0039174 A1 | 2/2004 | Barker et al. |
| 2004/0049013 A1 | 3/2004 | Milanova et al. |
| 2004/0105904 A1 | 6/2004 | Monagle |
| 2004/0156979 A1 | 8/2004 | Villagran et al. |
| 2004/0161512 A1 | 8/2004 | Akashe et al. |
| 2004/0161513 A1 | 8/2004 | Akashe et al. |
| 2004/0161525 A1 | 8/2004 | Akashe et al. |
| 2004/0170743 A1 | 9/2004 | Akashe et al. |
| 2004/0170744 A1 | 9/2004 | Akashe et al. |
| 2004/0170748 A1 | 9/2004 | Singh |
| 2004/0175474 A1 | 9/2004 | Akashe et al. |
| 2004/0175479 A1 | 9/2004 | Akashe et al. |
| 2004/0197463 A1 | 10/2004 | Gottemoller |
| 2004/0224074 A1 | 11/2004 | Cho |
| 2004/0253354 A1 | 12/2004 | Copeland et al. |
| 2004/0253355 A1 | 12/2004 | Akashe et al. |
| 2004/0254353 A1 | 12/2004 | Barker et al. |
| 2005/0031767 A1 | 2/2005 | Schweizer et al. |
| 2005/0031774 A1 | 2/2005 | Brown et al. |
| 2005/0042715 A1 | 2/2005 | Murray et al. |
| 2005/0079259 A1 | 4/2005 | Gao et al. |
| 2005/0084470 A1 | 4/2005 | Abbas |
| 2005/0095345 A1 | 5/2005 | Schillinger et al. |
| 2005/0165220 A1 | 7/2005 | Barker et al. |
| 2005/0220977 A1 | 10/2005 | Singh et al. |
| 2005/0220978 A1 | 10/2005 | Arudi et al. |
| 2005/0220979 A1 | 10/2005 | Baumer et al. |
| 2005/0249865 A1 | 11/2005 | Liu et al. |
| 2005/0255145 A1 | 11/2005 | Macgregor et al. |
| 2005/0287234 A1 | 12/2005 | Sakata et al. |
| 2006/0002878 A1 | 1/2006 | Acher et al. |
| 2006/0013936 A1 | 1/2006 | Miskovsky |
| 2006/0019017 A1 | 1/2006 | Singh et al. |
| 2006/0051492 A1 | 3/2006 | Mueller et al. |
| 2006/0062889 A1 | 3/2006 | Houston et al. |
| 2006/0073252 A1 | 4/2006 | Ishikawa et al. |
| 2006/0100133 A1 | 5/2006 | Bringe |
| 2006/0105097 A1 | 5/2006 | Akashe et al. |
| 2006/0121176 A1 | 6/2006 | Mozaffar |
| 2006/0134310 A1 | 6/2006 | Cho et al. |
| 2006/0188641 A1 | 8/2006 | Baumer et al. |
| 2006/0188642 A1 | 8/2006 | Yakubu et al. |
| 2006/0188643 A1 | 8/2006 | Solorio et al. |
| 2006/0193966 A1 | 8/2006 | Wu et al. |
| 2006/0211874 A1 | 9/2006 | Smallridge et al. |
| 2006/0228462 A1 | 10/2006 | Mozaffar |
| 2006/0228463 A1 | 10/2006 | Mozaffar |
| 2006/0292273 A1 | 12/2006 | Konwinski et al. |
| 2006/0292284 A1 | 12/2006 | Irwin et al. |
| 2007/0014896 A1 | 1/2007 | Wong et al. |
| 2007/0031577 A1 | 2/2007 | Budolfsen et al. |
| 2007/0042103 A1 | 2/2007 | Cho |
| 2007/0042106 A1 | 2/2007 | Wagner et al. |
| 2007/0042107 A1 | 2/2007 | Kenneth et al. |
| 2007/0077345 A1 | 4/2007 | Borders et al. |
| 2007/0092633 A1 | 4/2007 | Singh |
| 2007/0128323 A1 | 6/2007 | Tsujii et al. |
| 2007/0207244 A1 | 9/2007 | Crank |
| 2007/0207254 A1 | 9/2007 | Crank |
| 2007/0207255 A1 | 9/2007 | Crank |
| 2011/0034394 A1* | 2/2011 | Kaae .............. A23L 33/14 426/62 |

FOREIGN PATENT DOCUMENTS

| | | |
|---|---|---|
| DE | 3339341 | 5/1984 |
| EP | 0165451 | 12/1985 |
| EP | 0289183 | 11/1988 |
| EP | 0883997 | 12/1998 |
| EP | 1197154 | 4/2002 |
| EP | 1310478 | 5/2003 |
| EP | 1512324 | 3/2005 |
| EP | 1512325 | 3/2005 |
| EP | 1512326 | 3/2005 |
| EP | 1527701 | 5/2005 |
| EP | 1618791 | 1/2006 |
| GB | 789427 | 1/1958 |
| JP | 55162989 | 12/1980 |
| JP | 7087896 | 4/1995 |
| RU | 2003126178 | 3/2005 |
| WO | WO 01/37681 | 5/2001 |
| WO | WO 01/62226 | 8/2001 |
| WO | WO 02/065849 | 8/2002 |
| WO | WO 02/089597 | 11/2002 |
| WO | WO 03/013275 | 2/2003 |
| WO | WO 2004/073416 | 9/2004 |
| WO | WO 2005/107492 | 11/2005 |
| WO | WO 2006/047308 | 5/2006 |
| WO | WO 2006/099412 | 9/2006 |
| WO | WO 2007/002450 | 1/2007 |
| WO | WO 2007/050535 | 5/2007 |
| WO | WO 2007/103753 | 9/2007 |
| WO | WO 2007/103757 | 9/2007 |
| WO | WO 2007/103785 | 9/2007 |
| WO | WO 2008/108880 | 9/2008 |

OTHER PUBLICATIONS

Hettiarachchy, N.S. et al., "Functionality of Soy Proteins," in Protein Functionality in Food Systems, CRC Press, 1st Edition (1994) 311-314, 319-320.

Lawhon, J.T. et al., "Soy protein ingredients prepared by new processes—aqueous processing and industrial membrane isolation," J. Amer. Oil Chemists Soc. (1981) 58(3):377-384.

Lamsal, B.P. et al., "Flaking and extrusion as mechanical treatments for enzyme-assisted aqueous extraction of oil from soybeans," JAOCS (2006) 83(11) 973-979.

Leung, W.W-F., "Applications of Sedimenting Centrifuges," in Industrial Centrifugation Technology, McGraw-Hill Professional, 1st Edition (1998) 123-127.

Reddy, P.V. et al., "Release of free fatty acids from raw or processed soybeans and subsequent effects on fiber digestibilities," J. Dairy Sci. (1994) 77:3410-3416.

Rosenthal, A. et al., "Simultaneous aqueous extraction of oil and protein from soybean: mechanisms for process design," Trans IchemE (1998) 76:224-230.

Wan, P.J. et al., from Technology and Solvents for Extracting Oilseeds and Nonpetroleum Oil, AOCS Press (1997) 112-113.

Yada, R.Y., Proteins in Food Processing, Woodhead Publishing Limited and CRC Press LLC (2004) 523-529.

International Search Report and Written Opinion of the International Searching Authority for Application No. PCT/US2007/63174 dated Sep. 25, 2007.

International Search Report and Written Opinion of the International Searching Authority for Application No. PCT/US2007/63111 dated Aug. 24, 2007.

International Search Report and Written Opinion of the International Searching Authority for Application No. PCT/US2007/63115 dated Aug. 24, 2007.

International Search Report and Written Opinion of the International Searching Authority for Application No. PCT/US2007/077513 dated Feb. 13, 2008.

United States Patent Office Action for U.S. Appl. No. 11/681,215 dated Aug. 24, 2009 (16 pages).

United States Patent Office Action for U.S. Appl. No. 11/681,217 dated Aug. 27, 2009 (20 pages).

(56) References Cited

OTHER PUBLICATIONS

United States Patent Office Action for U.S. Appl. No. 11/681,217 dated Apr. 8, 2010 (14 pages).
United States Patent Office Action for U.S. Appl. No. 11/681,215 dated Apr. 12, 2010 (17 pages).
United States Patent Office Action for U.S. Appl. No. 11/681,217 dated Dec. 7, 2010 (15 pages).
United States Patent Office Action for U.S. Appl. No. 13/154,054 dated Mar. 7, 2012 (10 pages).
United States Patent Office Action for U.S. Appl. No. 11/681,215 dated Dec. 8, 2010 (12 pages).
United States Patent Office Action for U.S. Appl. No. 11/681,215 dated Dec. 5, 2011 (18 pages).
United States Patent Office Action for U.S. Appl. No. 11/681,215 dated Jun. 29, 2012 (26 pages).
United States Patent Office Action for U.S. Appl. No. 11/995,090 dated Jun. 3, 2011 (15 pages).
United States Patent Office Action for U.S. Appl. No. 11/995,090 dated Nov. 1, 2011 (12 pages).
United States Patent Office Action for U.S. Appl. No. 11/995,090 dated Apr. 4, 2012 (14 pages).

\* cited by examiner

METHODS OF SEPARATING FAT FROM NON-SOY PLANT MATERIALS AND COMPOSITIONS PRODUCED THEREFROM

CROSS-REFERENCE TO RELATED APPLICATIONS

This application is a division of U.S. patent application Ser. No. 13/543,405, filed Jul. 23, 2012, which is a continuation of U.S. patent application Ser. No. 13/154,054, filed Jun. 6, 2011, which is a continuation of U.S. patent application Ser. No. 11/681,217, filed Mar. 2, 2007, now abandoned which claims the benefit of U.S. Provisional Patent Application No. 60/778,802, filed Mar. 3, 2006, each of which is incorporated by reference herein.

STATEMENT REGARDING FEDERALLY SPONSORED RESEARCH

None.

INTRODUCTION

Plant materials, particularly oilseeds, are processed to produce a wide variety of food products including oils and plant-derived proteins. Recently, consumer demand for low- or reduced-fat, high protein plant-derived products has increased dramatically. In addition, there is growing consumer demand for natural, organic and environmentally friendly or "green" food products and plant-derived nutraceuticals. Several methods are currently used commercially to produce plant-based oils, proteins and other plant-based products for use in food production, including solvent extraction and a variety of press-based methods, e.g., extruder, expeller, continuous, and cold presses.

These methods provide a crude oil and a partially defatted plant material that can be further processed into refined oils, fats, gums and plant-derived proteins. In solvent extraction, a solvent, commonly hexane is used to produce an oil and a defatted plant material that contains residual solvents. These solvents are not considered natural and cannot be used to produce certified organic food products under United States Department of Agriculture's (USDA) guidelines for organic food labeling.

In contrast, the press-based methods can be used to produce foods that may be certified organic. One particular type of press-based method, the extruder press method, is used commercially to produce organic plant protein products and organic plant-derived oils. Oil recovery from the extruder press method is relatively inefficient and a fairly high percentage of fat remains in the cake. Commercially available partially defatted cakes and flour produced by the extruder press method are characterized by poor protein solubility and reduced protein functionality.

Therefore, there exists a need in the art for a method to separate proteins and fats from plant materials to produce low-fat, protein-rich compositions and vegetable oils that can be certified organic.

SUMMARY

In one aspect, the present invention provides a method of processing a non-soy plant material. A plant material is aqueously extracted to produce an extract, which is centrifugally separated into a fat-enriched fraction and a reduced-fat extract. The fat-enriched fraction may optionally be further processed to produce an oil. The reduced-fat extract may optionally be further processed to produce an evaporated or spray dried product.

Alternatively, the reduced-fat extract may be concentrated to produce a reduced-fat plant protein composition. The reduced-fat extract may optionally be contacted with an acid in an amount effective to produce a first curd and whey. The curd is then separated from the whey to produce a first reduced-fat plant protein composition. The first reduced-fat plant protein composition may be washed to produce a second reduced-fat plant protein composition.

Alternatively, the reduced-fat extract may be subjected to filtration to produce a first reduced-fat plant protein composition. The resulting first reduced-fat plant protein composition may be subjected to a further round of filtration to obtain a second reduced-fat plant protein composition.

Also provided are a fat-enriched fraction, a reduced-fat plant extract, a reduced-fat plant protein composition having at least 65% dry weight protein, a reduced-fat plant protein composition having at least 85% dry weight protein, a crude oil, plant gums, a degummed oil, and a protein-fat sediment produced according to the methods described herein. Food products containing the various plant compositions are also provided.

DETAILED DESCRIPTION OF THE INVENTION

Figure 1:
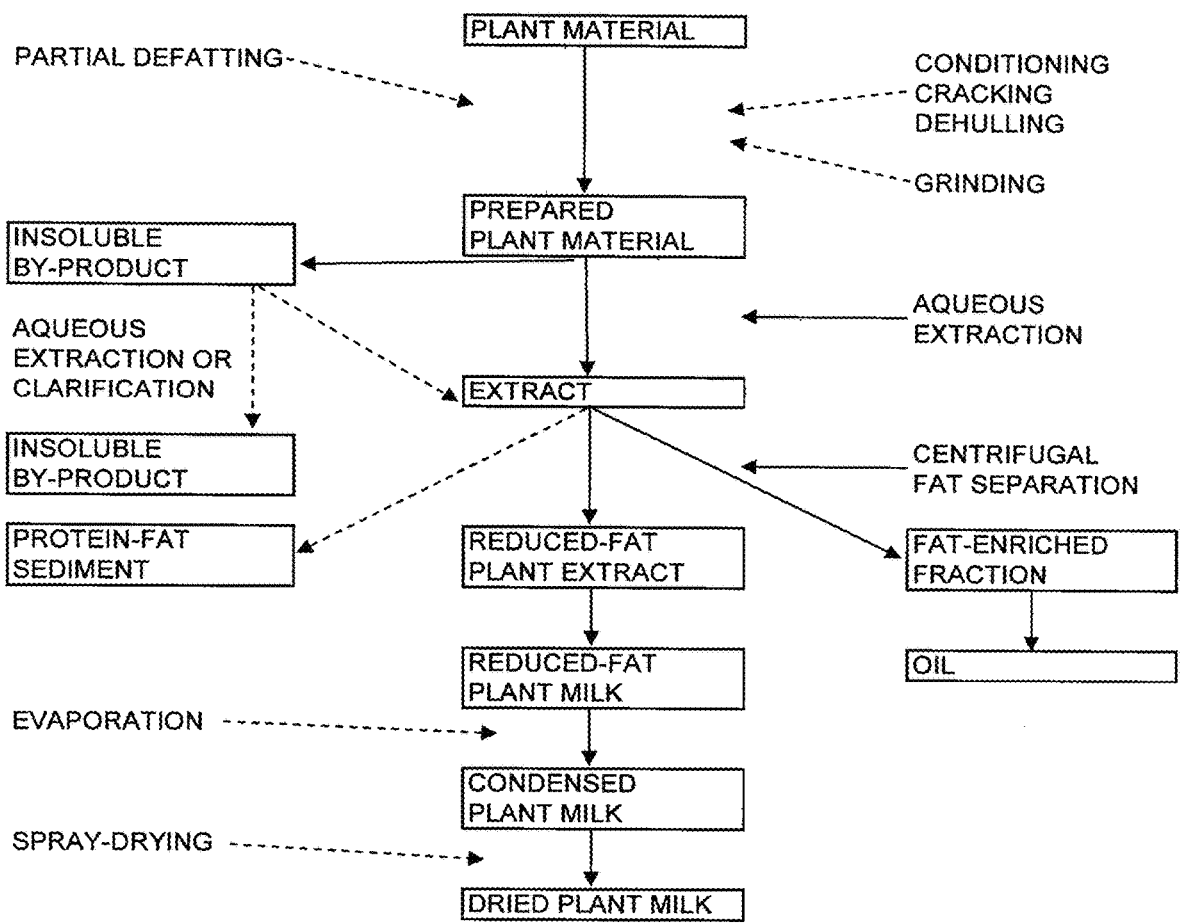
FIG. 1 is a schematic flow diagram showing a method of fractionating plant material to produce plant-based milk. Dashed lines represent alternative or optional steps in the process.

The present invention provides methods for fractionating non-soy plant materials by aqueously extracting the plant material and centrifugally separating the aqueous extract to produce a fat-enriched fraction (or "cream") and a reduced-fat extract. The aqueously extracted plant material is centrifugally separated based on the differential densities of the materials to form a relatively high density reduced-fat fraction (the reduced-fat extract) and a relatively low density fat-enriched fraction. The reduced-fat extract has an increased protein to fat ratio as compared to the starting plant material. The fat-enriched fraction and the reduced-fat extract can be further processed to obtain a variety of products having desirable characteristics. As shown in the Examples, the methods described herein may be used to remove 60% or more of the fat from full fat plant materials.

The reduced-fat extract prepared according to the methods may be used to produce a reduced-fat plant milk having at least about 50% protein and about 15% or less fat, or it may be further processed to make reduced-fat plant protein compositions. The reduced-fat plant protein compositions may contain at least 65% dry basis protein (a protein concentrate) or may contain at least 90% dry basis protein (a protein isolate). The fat-enriched fraction can be further processed to produce oils, soaps and gums (including lecithin-like emulsifiers). In some embodiments, a protein-fat sediment comprising fiber and enriched in phospholipids may be obtained. FIGS. 1-4 diagram how plant materials may be processed to obtain various compositions useful in the manufacture of a variety of food products and nutraceuticals.

The present invention may be practiced using any non-soy plant material comprising protein and fat. Examples of non-soy plant materials useful in the methods of invention include, but are not limited to, canola (rapeseed), castor bean, cottonseed, flaxseed, palm kernel, linseed, candlenut, sesame seed, peanut, coconut, corn, corn germ, sunflower, safflower, oats, chic, kukui, pumpkin, walnut, grape, primrose, rice bran, almond, olive, avocado, beech, brazil, pecan, pistachio, hickory, filbert, macadamia, cashew, neem, hemp, lupin, coffee, poppy, pepper, mustard seed, wheat and wheat germ.

Any suitable non-soy plant material may be used in the method of the invention, provided that aqueous extraction of the plant material yields an aqueous extract comprising fat capable of being removed by centrifugation. The plant materials include, but are not limited to, natively grown plants, traditional crop grown plants, non-GMO (genetically modified organism) plants, GMO plants and organically grown plants. The plant materials used may be substantially full fat plant materials, i.e. plant materials that have not been defatted prior to milling. Alternatively, the plant material can be partially defatted by any suitable method. A partially defatted plant material includes any plant material from which at least a portion of the fat has been removed. Methods of obtaining a partially defatted plant material are known in the art and include, but are not limited to screw press, extruder press, cold press, high pressure liquid extraction using e.g., carbon dioxide, nitrogen, or propane and supercritical fluid fat extraction. The partially defatted cakes thus produced are optionally milled into partially defatted flour prior to aqueous extraction and centrifugal fat separation. Flour, flakes, cakes, grits and meals for use in the centrifugal fat separation methods are commercially available. In the Examples, full fat flour was used as the starting material.

Substantially full fat plant materials may have a fat content of 10% or more fat by weight. Suitably the fat content of a substantially full fat plant material is at least about 15%, 20%, 30%, 40% or even 50% by weight. The fat content of a partially defatted plant material may be greater than about 5%, 10% or 15% fat by weight.

The plant material used in the methods can be prepared for processing by any suitable means, including but not limited to, drying, conditioning to achieve an equilibrated moisture level, dehulling, cracking, and cleaning to remove trash, weeds, hulls or other undesirable material from the plant material by counter current air aspiration, screening methods or other methods known in the art. The plant materials are optionally further processed by milling using any suitable means including grinding, but not limited to, using a hammer mill, rollermill or a screw-type mill. The resulting flour can have a variety of particle sizes. Suitably 40 to 1000 mesh flour is used for extraction, more suitably 100 to 600 mesh flour is used, but any suitable flour, flake, grit, meal or cake may be used.

The full-fat or partially defatted plant material is extracted with an aqueous solution, suitably water. As used herein, the term "aqueous solution" includes water substantially free of solutes (e.g., tap water, distilled water or deionized water) and water containing solutes. As one of skill in the art will appreciate, the aqueous solution may contain additives such as salts, buffers, acids and bases. Fat separation can be effected by the described methods without requiring the addition of demulsifiers; suitably the aqueous solution is substantially free of demulsifiers. Aqueous solutions substantially free of demulsifiers include those containing about 0.01% or less demulsifier by weight. Suitably the aqueous solution contains about 0.005% or less, or more suitably about 0.001% or less demulsifier by weight. Suitably, the aqueous solution has an ionic strength of about 0.10 N or less, more suitably about 0.07 N, 0.05 N or 0.02 N or less. The extraction temperature may be between about 32° F. and about 200° F., suitably from about 32° F. to about 150° F., more suitably between about 80° F. and about 150° F., more suitably between about 90° F. and about 145° F. and even more suitably between about 110° F. and 140° F. Products having different functional characteristics may be obtained by including additives or varying the extraction temperature.

In the Examples below, water is added to the flour in a ratio of about 4 to about 16 parts by weight to each part of plant material. However, more or less water may be used. In the Examples, the pH was adjusted by adding a base, such as calcium hydroxide, to facilitate extraction of the proteins. Other bases may be added to adjust the pH, including but not limited to, sodium hydroxide, ammonium hydroxide, and potassium hydroxide. Suitably the pH is adjusted to between about 6.0 and about 10.5, even more suitably the pH is adjusted to between about 7.0 and about 9.0 to optimize extraction. Suitably the pH is greater than about 7.0 and more suitably the pH is about 7.5. The extraction may be conducted with or without agitation for a period of time effective to extract protein. Suitably the extraction is conducted for at least 10 minutes, and more suitably extraction is conducted for at least 30 minutes, 1 hour, 2 hours, or 4 hours. As one of skill in the art will appreciate, longer extraction periods may be used.

The extract may be separated from at least a portion of the insoluble by-product (e.g., insoluble fiber fraction) prior to fat removal by centrifugation. This may be accomplished using horizontal decanters, disk-type desludgers, disk-type clarifiers, or similar machines to separate liquids and solids. In the Examples, a disk-type clarifying centrifuge was utilized to remove the insoluble by-product prior to centrifugal fat separation. The insoluble fiber fraction may be used for animal feed, or further processed and dried for use as an animal or human food ingredient.

Optionally, to increase recovery of protein, the insoluble fiber fraction can be washed by adding aqueous solution to the insoluble by-product and centrifuging as above. A disk-type clarifying centrifuge may optionally be used to remove residual insoluble fiber fraction. The resulting extract can then be subjected to centrifugal fat separation as detailed below.

In general, relatively large, low density fat globules can be separated from the aqueous extract by centrifugal fat separation more completely than smaller, higher density fat globules. Fat globule size may be affected by the preparation of the plant material and the by the extraction conditions. Centrifugal fat separation may be improved by preparing the extract in a way that maintains the density differential between the fat globules and the water in the aqueous extract. Centrifugal separation of fat may be enhanced by minimizing mechanical treatments, minimizing storage time and exposure to heat of plant materials prior to fat separation, storing and processing raw materials as whole, undamaged plant material until close to time of use, minimizing exposure to air after initial processing, minimizing microbial growth in the aqueous extract, minimizing foam generation in aqueous extract, minimizing air entrainment in the aqueous extract, selecting processing conditions and heat treatments which do not increase the free fatty acid content of the aqueous extract, eliminating treatments that promote emulsification, and maintaining the pH of the extract above about 6.0. Suitably at least about 40%, 50%, 60%, 70%, 80%, or 90% of the fat is removed from the reduced-fat extract after centrifugal separation.

Centrifugal separation of the aqueous extract may be accomplished by any suitable method and can be performed as a batch, semi-continuous or continuous process. Briefly, the aqueous plant extract may be delivered to a continuous disk-type separator operated under conditions that allow separation of at least a portion of the fat from the remaining extract. The separator may be configured either with a solid bowl or with a continuous or intermittent solids discharge design. The disk angles and the disk spacing may be altered as well. In one embodiment, a continuous discharge, disk-type, two-phase solid bowl separator, such as model MP-1254 from Westfalia Separator Industries (Oelde, Germany) is used. Alternatively, a three-phase separator, such as model MRPX-418 HGV from Westfalia Separator Industries (Oelde, Germany), may be used. Use of a three phase separator allows simultaneous separation of insoluble by-products (e.g., insoluble fiber fraction) from the reduced-fat plant extract and the fat-enriched fraction.

In another embodiment, at least a portion of the insoluble fiber fraction is removed from the aqueous extract by centrifugation prior to centrifugal separation of the fat-enriched fraction from the reduced-fat extract as described above. Preferably some fiber remains in the extract. A three phase separator may then be used to form a reduced-fat extract, a fat-enriched fraction and a sediment containing protein, fat and fiber (protein-fat sediment). The resulting protein-fat sediment has a unique composition, is enriched in phospholipids and may be useful in production of food products or nutraceuticals.

The percentage of fat removed from the plant extract can be varied by altering the specific parameters used for centrifugal separation consistent with Stokes law. The efficiency of fat removal can be affected by altering the feed rate of the extract into the separator (time) or the g-force applied by the separator (angular velocity). Centrifugal fat separation may result in about a 2 fold increase in the protein to fat ratio of the reduced-fat extract as compared to the extract prior to centrifugal fat separation. Suitably, the protein to fat ratio increase is about 3 fold, 4 fold or more. The centrifugal fat separation process may remove at least about 40% of the fat content of the extract by weight. Suitably the centrifugal fat separation process may remove about 60%, 70% or even more of the fat by weight from the extract. The reduced-fat extract produced by the methods suitably has a 3 to 1 protein to fat ratio. The protein to fat ratio is more suitably about 4 to 1, 5 to 1, 6 to 1, 8 to 1, 10 to 1 or even 12:1.

The relative amount of fat removed from the extract can also be affected by altering the preparation of the extract. For example the milling process, extraction and handling of the plant material may affect the amount of fat removed by centrifugal fat separation. One of skill in the art will appreciate that the efficiency of fat separation can be altered by changing the preparation methods in a variety of ways including, but not limited to, altering the density of the plant extract, the extraction temperature or the size of fat globules in the extract. While any temperature may be used for centrifugal fat separation, a temperature between about 120° F. and about 180° F. is suitable. More suitably, a temperature between about 120° F. and about 150° F. is utilized.

The fat-enriched fraction (or cream) and the reduced-fat extract (reduced-fat plant milk) can be further processed to produce reduced-fat plant protein products and plant-derived oils. The fat-enriched fraction may be cooled and stored in refrigerated tanks for use as a food ingredient in other applications or further processed to remove at least a portion of the water to produce plant-derived oils and gums using methods known in the art. (See Erickson, et al. 1980. Handbook of Soy Oil Processing and Utilization, American Soybean Association and the American Oil Chemists Society, St. Louis, Missouri and Champaign, Illinois incorporated herein by reference in its entirety.) The reduced-fat extract can be used as reduced-fat plant milk or be further processed to produce protein concentrate or protein isolate using methods known in the art. (See Zerki Berk, 1992. Technology of Production of Edible Flours and Protein Products from Soybeans, Food and Agriculture Organization of the United Nations Agriculture Services Bulletin No. 97, Haifa, Israel, incorporated herein by reference in its entirety.)

After centrifugal fat separation, the resulting reduced-fat plant extract can be used to produce a low fat or nonfat plant milk product as diagrammed in FIG. 1. The reduced-fat plant milk may be consumed as a liquid or may be used to manufacture numerous food products. For example, the solids concentration or pH may be adjusted, additives can be included, or reduced-fat extract may be subjected to further processing to create specific reduced-fat plant extract products. The food products include, but are not limited to, plant milk beverages, yogurt, or other products with functional properties advantageous for a specific food product application as discussed below. Optionally, a portion of the fat-enriched fraction can be added to the reduced-fat extract to produce plant extracts having a precise protein to fat ratio. For example, the reduced-fat plant extract could have fat added to produce a low-fat, rather than a nonfat product. Alternatively, the reduced-fat plant extract may be condensed in an evaporator, or may be spray dried to produce a reduced-fat plant extract powder. The reduced-fat plant extract may also be used in a variety of food products.

The plant milk product may be designated as either low fat or nonfat depending on the ratio of protein to fat in the plant milk. Low fat plant milk can be produced by removing enough fat from the plant extract, or alternatively adding fat back to the reduced-fat plant extract, so that the protein to fat ratio is at least 4 to 1 (w/w). These reduced-fat plant milk products contain at least 55% protein on a dry solids basis and 15% or less dry weight acid hydrolyzed fat. Suitably reduced-fat plant milk products contain at most 10% dry weight acid hydrolyzed fat and at least 60% dry weight protein. More suitably the protein to fat ratio of reduced-fat plant milk is 6 to 1 (w/w) or higher. As described above, the amount of fat removed by centrifugal fat separation can be altered by adjusting the parameters of the fat separation method to produce fat free or nonfat plant milk by centrifugally removing additional fat so that the ratio of protein to fat in fat free milk is at least 12 to 1 (w/w).

A reduced-fat extract may optionally be further processed to make reduced-fat plant protein compositions by concentration and separation methods known in the art, such as acid precipitation of the proteins and filtration, including e.g.

ultrafiltration, microfiltration or diafiltration. These methods can be used to produce plant protein compositions that are organic certifiable. The protein compositions produced may be a concentrate, containing at least 65% protein on a dry weight basis, or an isolate, containing at least 90% protein on a dry weight basis, depending on the specific process used and the starting materials. Suitably the final protein compositions contain at least about 65%, 75%, 85% or 90% protein on a dry weight basis. The final protein products may comprise a protein to fat ratio of at least about 5 to 1 (w/w) and optionally a protein to fat ratio of about 8 to 1, about 10 to 1 or even about 12 to 1 (w/w) or higher. The reduced-fat plant protein compositions may contain about 15% or less dry weight fat and suitably contain about 10% or even about 7% or less dry weight fat.

Figure 2:
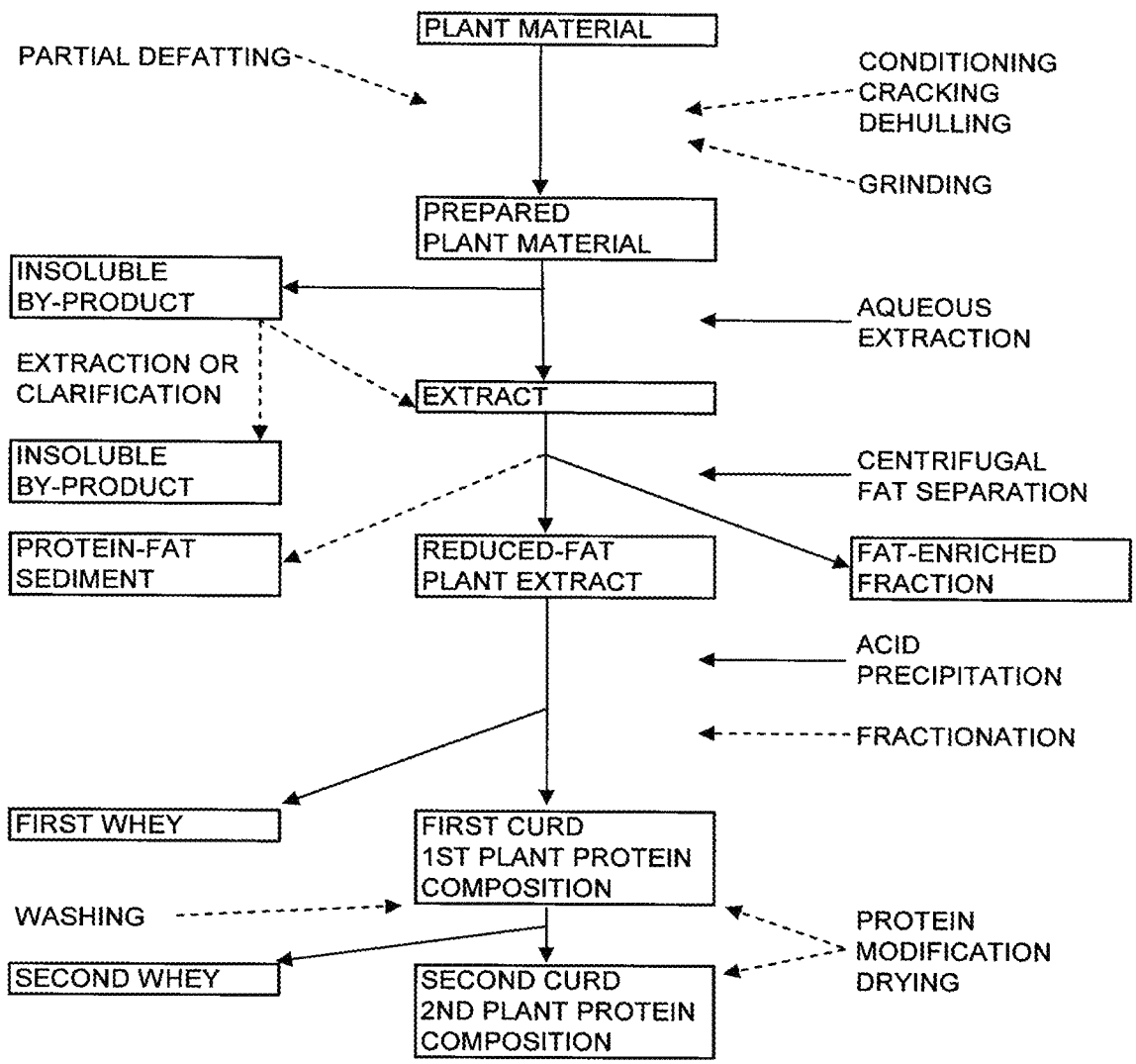
FIG. 2 is a schematic flow diagram showing a method of fractionating plant material to produce a reduced-fat plant protein and a fat fraction using acid precipitation. Dashed lines represent alternative or optional steps in the process.

In the Examples, proteins in the reduced-fat extract were concentrated by precipitation and separated, as diagrammed in FIG. 2, to produce a plant protein concentrate or isolate from partially defatted plant material. Briefly, proteins in the reduced-fat extract can be precipitated by adding acid, such as citric acid, to the isoelectric point of the protein. Any suitable acid may be used. The precipitated protein ("first curd") can be separated from the first whey in a continuous horizontal decanter, disk-type clarifier, or disk-type desludger, such as the disk-type clarifying centrifuge model SB-7 available from Westfalia Separator Industries (Oelde, Germany) used in the Examples below. The separated first curd constitutes the first reduced-fat plant protein composition. The first plant protein compositions produced in the Examples were washed by adding an aqueous solution to the first plant protein composition and centrifuging to produce second plant protein compositions with higher concentrations of protein.

Figure 3:
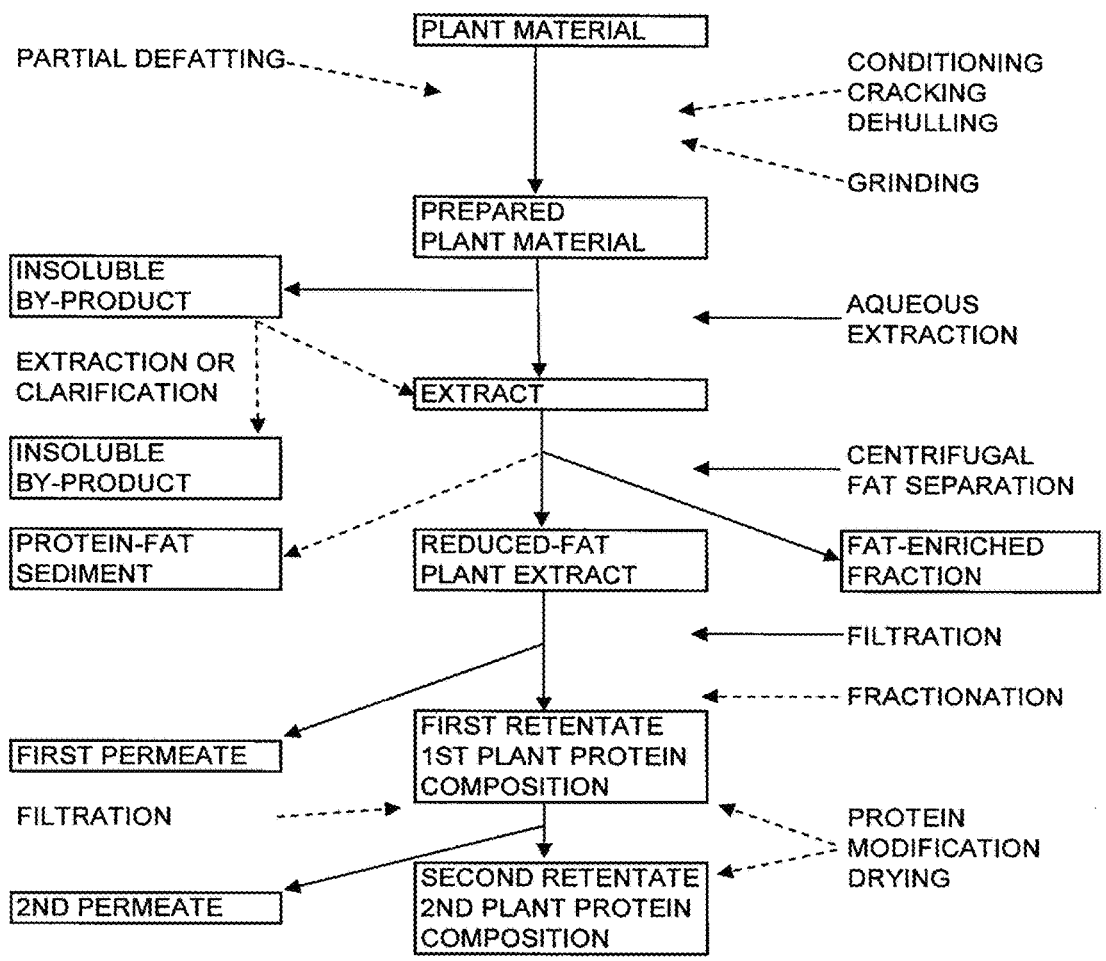
FIG. 3 is a schematic flow diagram showing a method of fractionating plant material to produce a reduced-fat plant protein and a fat fraction using ultrafiltration and/or diafiltration. Dashed lines represent alternative or optional steps in the process.
Figure 4:
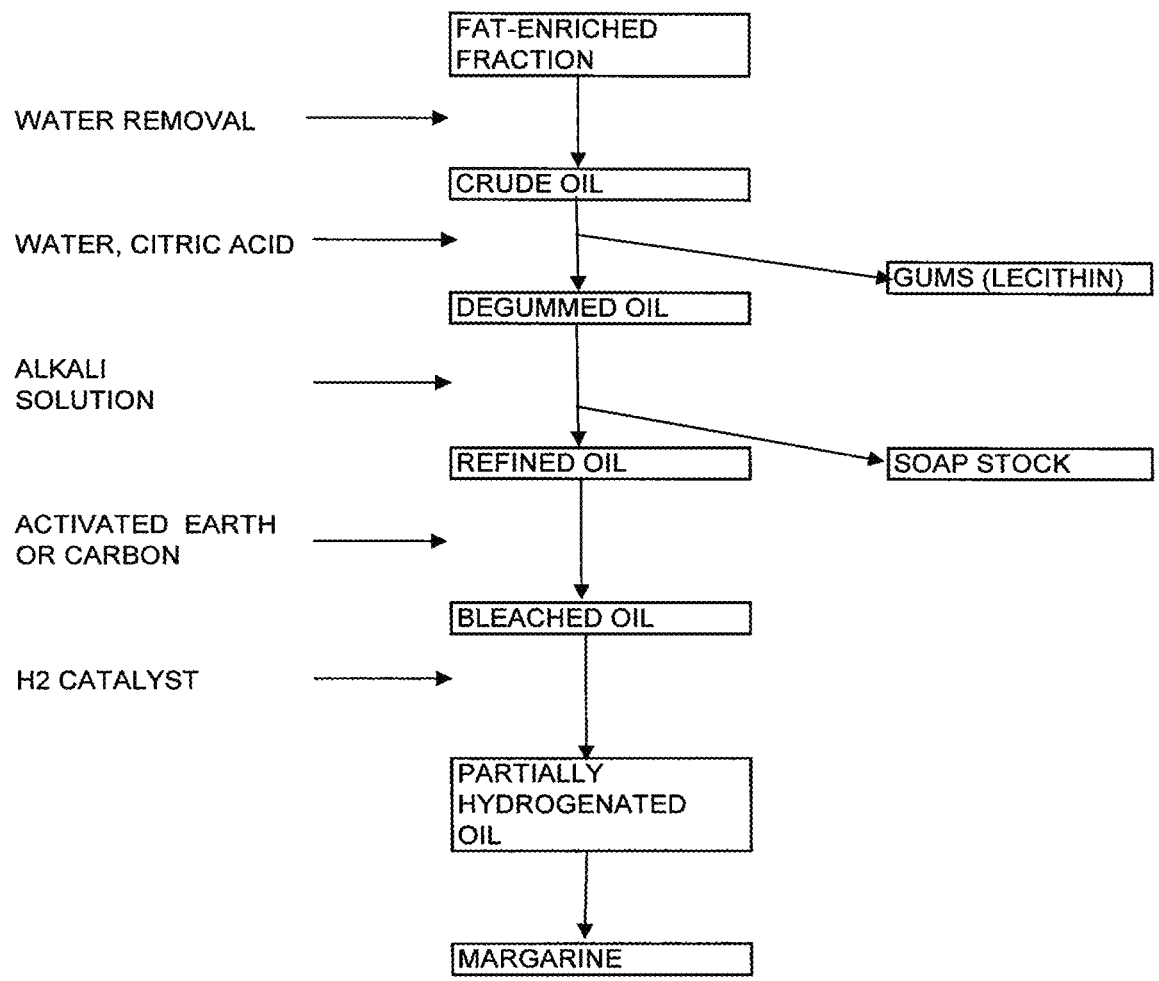
FIG. 4 is a schematic flow diagram showing a method of processing a fat-enriched fraction to produce plant gums, oils and fats. Dashed lines represent alternative or optional steps in the process.

Alternatively, the reduced-fat extract may be concentrated and separated by other methods known to those of skill in the art, such as filtration, as diagrammed in FIG. 3, to produce plant protein compositions from plant material. This process includes passing the reduced-fat extract through a microporous filtration membrane system to produce a protein-rich retentate. The protein-rich retentate from filtration (first reduced-fat plant protein composition) may be modified and dried to a powder to produce a dried plant protein composition, or further processed in a second stage filtration process. The second retentate constitutes the second reduced-fat plant protein composition.

Plant protein concentrate and isolate may be used by persons skilled in the art to make numerous products. For example, the solids concentration and pH may be adjusted or the reaction conditions altered to produce protein products with different functional characteristics. In addition, various additives may be included or procedures performed using the concentrates and isolates to create specific products with functional properties advantageous for a particular application. For example, a portion of the fat-enriched fraction can be added to the plant protein composition to adjust the protein to fat ratio. The plant concentrates and isolates prepared by the methods may be used to manufacture many different types of products. The resulting plant protein isolate or concentrate can be dried to a free flowing powder in a spray drier, flash drier, or other similar food grade drying system known to those of skill in the art.

The products produced by this method are expected to have increased functionality as compared to organic certifiable plant protein products currently available (e.g., those produced by hot press methods) because plant materials that have not been exposed to high heat environments can be used as starting materials. Additionally, the resulting products will not contain the undesirable contaminants associated with hexane or alcohol extracted plant materials.

These products may have desirable functional properties associated with plant material protein concentrates and isolates. The following functional properties will be evaluated for the reduced-fat non-soy plant proteins made with centrifugal fat separation as compared to currently available plant protein compositions: surface hydrophobicity, water binding ability, fat binding, emulsification, gel hardness and deformability, solution particle size, solubility, dispersibility, whippability, viscosity, color and taste as well as others.

Reduced-fat plant protein compositions of the present invention suitably have a substantially bland taste and an off-white color such that their use in production of a food product will not negatively affect the taste or color of the food product.

It is reasonably expected that because the centrifugal fat separation technique may be performed on full fat starting materials that have not been hexane or alcohol extracted or exposed to high temperatures, the resulting plant protein compositions may also contain enhanced levels of beneficial microconstituents, such as phospholipids, saponins, tocopherols and sterols.

Different plant protein may have different characteristics and advantages as will be appreciated by those of skill in the art. For example, hemp protein supplies enough of each of the essential amino acids to contribute to the human body's requirements. An important aspect of hemp protein is that it is a quality source of the amino acids arginine and histidine and of the sulphur-containing amino acids methionine and cysteine. Hemp protein also contains relatively high levels of the branched-chain amino acids that are crucial in the repair and growth of lean body mass. Almost two-thirds of hemp protein is made up of edestin, a globulin protein found only in hemp seeds. Edestin is a type of plant protein that is similar to proteins found in the human body. In addition, another one-third of hemp's protein is albumin, another high quality, low molecular weight globulin protein that is also found in egg whites. Due to the low viscosity, high protein content, bland flavor, nutritional value of the amino acids, and molecular weight profile of the hemp protein composition, this would be an excellent protein source for nutritional bars and nutritional beverages. For example the very low viscosity demonstrated for the hemp protein compositions demonstrated in Example 10 would be advantageous in liquid and dry blend beverages, milk replacers, infant formula, whole muscle meat injection products and the like.

Reduced-fat plant extracts and reduced-fat plant protein compositions can be used to make a wide variety of food products. These food products include, but are not limited to, confectionary products, bakery products, injection meat products, emulsified meat products, ground meat products, meat analog products, cereals, cereal bars, dairy analog products, beverages, plant-based milk, liquid or powdered dietetic formula, texturized plant products, pasta, health nutrition supplements, and nutrition bars. In particular, a confectionary product may include, but is not limited to, candy or chocolate. A bakery product may include, but is not limited to, breads, rolls, biscuits, cakes, yeast baked goods, cookies, pastries, or snack cakes. An injection meat product includes, but is not limited to ham, poultry product, turkey product, chicken product, seafood product, pork product or beef product. An emulsified meat product includes, but is not limited to sausage, bratwurst, salami, bologna, lunchmeat, or hot dogs. A ground meat product includes, but is not limited to fish sticks, meat patties, meatballs, ground pork products, ground poultry products, ground seafood product or ground beef products. A meat analog product includes, but is not limited to sausages, patties, ground meatless crumbles, lunchmeat or hot dogs. A dairy analog product includes, but is not limited to milk products, yogurt products, sour cream products, whipped topping, ice cream, cheese, shakes, coffee whitener or cream products. A dietetic formula includes, but is not limited to infant formula, geriatric formula, weight loss preparations, weight gain preparations, sports drinks, or diabetes management preparations.

An almost infinite number of several of the food products may be made by altering the ingredients in the food product. For example, a number of ready to drink beverages may be produced using the protein compositions described herein as a partial or complete protein source. Persons skilled in the art may modify the type and content of proteins, sugar sources, fats and oils, vitamin/mineral blends, flavors, gums, and/or flavors to produce a beverage product designed to meet specific nutritional requirements, product marketing claims, or targeted demographic groups. For example, nutritional bars may be produced using the non-soy plant protein compositions as a partial or complete protein source. Persons skilled in the art may modify the type, texture, and content of proteins, sugar sources, fats and oils, vitamin/mineral blends, flavors, coatings gums, and/or flavors to produce a nutritional bar designed to provide specific compositions to meet specific nutritional requirements, product marketing claims, or targeted demographic groups.

The fat-enriched fraction (or cream) can be processed into a crude oil by removal of at least a portion of the water from the fat-enriched fraction. The resulting crude oil is expected to have increased functionality and microconstituent content as compared to other crude oil preparations currently available. The free fatty acids value of the crude oil, as well as any oils produced from the crude oil, is generally lower than similar oils produced from hot pressed soy materials. The free fatty acids value of the oils may be measured by the standard method as described in Example 7.

The crude oil may be further processed by methods known to those of skill in the art to produce a variety of compositions. The first step in processing (i.e. refining) the fat-enriched fraction includes removal of phospholipids and hydratable phosphatides ("degumming") by addition of an acid and centrifugal separation of the resulting gums. The resulting gums may be analyzed for their phospholipids and mineral content. The content of several minerals including Mg, Ca, Na, Fe, K, P and Cl may be evaluated in the gums as well as in the crude oil and the degummed oil using standard methods such as the following: *AOAC 18th Ed. Method* 985.35, *Minerals in ready to Feed Milk Based Infant Formula,* 1997, *Standard Methods for the Examination of Water & Waste Water, Method* 3111, *Metals by Atomic Absorption Spectrophotometry,* 1999, and *AACC 10th Ed Method* 40-71, *Sodium and Potassium by Atomic Absorption Spectrophotometry,* 1999 each of which is incorporated herein by reference in its entirety. One measure of the quality of the gums is the amount of acetone insoluble matter present in the gums. The acetone insoluble matter in the gums can be measured as described in Example 7.

Plant gums may be further purified and used in foods and food products as an emulsifier, stabilizer, anti-spattering agent, dough improver, anti-staling agent and antioxidant. For example, plant gums may be used to promote solidity in margarine and to give consistent texture to dressings, sauces and other creamy products. Plant gums may also be used in bakery products, chocolates, instant food powders and other food product applications.

The degummed oil may be further refined to remove free fatty acids. Crude edible oils frequently contain undesirable amounts of free fatty acids that affect their quality. The term "free fatty acids" (FFA) is used to distinguish fatty acids that are not chemically bound to glycerol molecules as carboxylic esters. FFAs are more prone to oxidation than esterified fatty acids and hence can predispose fats and oils to oxidative rancidity characterized by off-flavor described as "bitter." Fats and oils, when pure, consist almost entirely of the esters of fatty acids and glycerol. "Fats" are solid at room temperature and "oils" are liquid at room temperature. As fats and oils are used in cooking, they tend to break down, degrade, and hydrolyze to free fatty acids, glycerol, and other polar materials. The free fatty acids are among the harmful products of this degradation.

The fatty acid composition, the total saturated and the total unsaturated fat in the various cream samples may also be determined. Fat and fatty acids are extracted by hydrolytic methods; the fat is extracted into ether, saponified, and then methylated to fatty acid methyl esters (FAMES). FAMES are quantitatively measured by capillary gas chromatography. The procedure is based on the two following official methods: (1) *AOAC 18th Edition, Method* 996.06, *Fat (Total, Saturated and Unsaturated) in Foods,* 2001, and (2) *AOCS, 5$^{th}$ Ed., Method Ce* 2-66, *Preparation of Methyl Esters of Fatty Acids,* 199, each of which is incorporated by reference in its entirety.

Various techniques may be employed to remove free fatty acids and other contaminants from crude fats and oils. Refining and deodorization of fats and oils are very commonly used techniques in the fat and oil industry to remove FFA. Alkali refining, used by the vast majority of European and American refiners (Braae, B., J. Am. Oil Chem. Soc 53:353 (1976); Can, R. A., J. Am. Oil Chem. Soc. 53:347 (1976) which are incorporated herein by reference in their entireties), consists of heating the fat or oil, then treating it with a concentrated caustic solution of sodium hydroxide. The crude oil is then separated from the resulting soap stock. The soap stock may be used for making soap or may be converted back to free fatty acids by treating with a strong mineral acid which can then be used as animal feed or further processed to generate distilled fatty acids.

The refined oil fraction may then be bleached by treatment with solid absorbents such as activated carbon that may then be removed by filtration. Deodorization, very commonly used in the fats and oils industry to remove odorous substances from the crude oil, may be accomplished by steam distillation of heated oil under a high vacuum. The deodorization process removes simultaneously the FFAs, fat-soluble vitamins (A, E, D, and K), mono-glycerides, sterols, and some pigments such as carotenoids. Deodorization also strips off the aroma and flavors of fats and oils resulting in a bland finished product. The free fatty acid content for edible fats and oils is a key factor in the quality, flavor, and odor of those fats and oils. The resulting refined, bleached and deodorized (RBD) oils can be used as salad or cooking oil and also in a variety of food product applications as would be apparent to those of skill in the art.

The following examples are meant only to be illustrative and are not intended to limit the scope of the invention.

EXAMPLE 1

Preparation of Reduced-Fat Canola Protein Compositions and Canola Cream From Canola Seeds Organically certified canola seeds were obtained from Montana Specialty Mills, Great Falls, Montana and were milled to 400 mesh flour using a grinding mill (model DNWA Buhler, Minneapolis, Minnesota). The full fat canola flour contained 5.2% moisture, 24.2% dry basis Kjeldahl protein, and 49.0% dry basis acid hydrolyzed fat for a protein to fat ratio of 0.49 to 1.

In this and all subsequent examples, the dry basis protein and fat ratios were measured by standard methods. The protein content of the soy materials was determined using the Kjeldahl method (AOAC 18th Ed. Method 991.2.2, Total Nitrogen in Milk, 1994, which is incorporated herein by reference in its entirety). Briefly, samples were digested using acid, catalyst and heat. The digested sample was made alkaline with the addition of sodium hydroxide. Steam was then used to distill the sample, releasing ammonia. The ammonia was collected in a receiving vessel and was back titrated with a standardized acid solution. The nitrogen content was then calculated. The protein content is the nitrogen content multiplied by a protein factor. The protein factor used for soy materials is 6.25.

The fat content of the soy materials was determined gravimetrically. Briefly, the sample was weighed into a Mojonnier flask. Acid was added and the sample heated until the solids were broken down. The sample was cooled and then extracted using alcohol, ethyl ether and pet ether. The flask was centrifuged and the resulting ether/fat layer was poured off into a pre-weighed aluminum dish. Samples were subjected to a series of 2 or 3 extractions depending on the fat level. The ether was evaporated and placed in an oven to dry. The sample was cooled in a desiccator and then weighed as described in the *Official Method of Analysis AOAC* 922.06, *Fat in Flour* which is incorporated herein by reference in its entirety.

In addition, the total solids present in the soy material were determined gravimetrically using standard procedures. Briefly, the sample was weighed and placed in an oven at a specific temperature for a specific time. Time and temperature were dependant on the sample type. For powder samples, a vacuum oven set at 100° C. for 5 hours was used. The sample was removed from the oven and cooled in a desiccator. The cooled sample was weighed and the total solids/moisture was calculated as describe in official methods of analysis, *Association of Official Analytical Chemists (AOAC)*, 18*th Edition* 927.05, *Moisture in Dried Milk* which is incorporated herein by reference in its entirety.

Thirty pounds of the full fat canola flour was extracted with 360 pounds of water at 125° F. in a 50 gallon agitated tank. The pH of the extraction slurry was adjusted to 7.5 by addition of calcium hydroxide (CODEX HL, Mississippi Lime Company, Saint Genevieve, MO) and held for a mean time of 35 minutes. The extract was separated from the insoluble by-product using a high g-force, disk-type clarifying centrifuge (model SB-7, Westfalia Separator Industry GmbH, Oelde, Germany) at an extract flow rate of 4.5 pounds per minute with intermittent solids discharge of 2 second duration on an 8 to 10 minute cycle. Sixteen point five pounds of insoluble by-product was collected and discarded at 22.6% solids, 25.9% Kjeldahl dry basis protein.

The extract was heated to 130° F. and delivered to a high g-force continuous discharge, disk-type separator (model MP-1254, Westfalia Separator Industry GmbH, Oelde, Germany) for separation of the fat-enriched cream fraction. The separator was fed at a rate of 14 pounds per minute, separating the fat-enriched fraction from the reduced-fat extract. Eighty nine point seven percent of the fat in the extract was removed. The reduced-fat extract, contained a protein to fat ratio of 7.7 to 1 with a proximate analysis of 51.1% Kjeldahl dry basis protein and 6.7% dry basis acid hydrolyzed fat. The fat-enriched canola fraction, also known as canola cream had a composition as identified in Table 4, and was further processed as described in Example 7.

EXAMPLE 2

Preparation of Reduced Fat Protein Products and Sunflower Cream From Raw Sunflower Seeds Raw sunflower kernels (SL80) were obtained from Dakota Gourmet (SunOpta, Wahpeton, ND). The raw sunflower kernels were ground with a grinding mill (All-Grain-Company model A-22, Brigham City, Utah) to produce 60 mesh sunflower flour. The sunflower flour had proximate analysis of 4.7% moisture, 27.6% dry basis Kjeldahl protein, 54.5% dry basis acid hydrolyzed fat and a 0.50 to 1 protein to fat ratio.

Twenty pounds of sunflower flour was extracted with 200 pounds of water at 140° F. in a 50 gallon agitated tank. The pH of the extraction slurry was adjusted to 7.1 by addition of 0.033 pounds of calcium hydroxide and held for a mean time of 0.75 hour. The extract was separated from the insoluble by-product by centrifuging at 4390 rpm in a Sharples P-660 decanting centrifuge (Alfa Laval Separation Inc., Warminster, Pa) at an extract flow rate of 5 pounds per minute. Twenty-two pounds of insoluble by-product was collected and discarded at 42.21% solids, 27.5% Kjeldahl dry basis protein.

The extract was reheated to 140° F. and delivered to a high g-force continuous discharge, disk-type separator (model MP-1254, Westfalia Separator Industry GmbH, Oelde, Germany) for separation of the fat-enriched sunflower cream fraction. The separator was fed at a rate of 14 pounds per minute, separating the fat-enriched fraction, also known as sunflower cream from the reduced-fat extract. Seventy six percent of the fat in the extract was removed. The reduced-fat extract, contained a protein to fat ratio of 3.5 to 1. The reduced-fat extract had a proximate value of 48.5% Kjeldahl dry basis protein and 13.7% dry basis acid hydrolyzed fat. The fat-enriched fraction, also known as sunflower cream had a composition as identified in Table 4, and was further processed as described in Example 7.

The reduced-fat extract was then precipitated by adding 129 grams of citric acid powder (Citric Acid, Anhydrous FCC grade, Xena International, Inc., Polo, IL) to a pH of 4.0 in an agitated tank at 130° F. The mixture was held for 15 minutes with mild agitation, and then fed continuously to in a Sharples P-660 decanting centrifuge (Alfa Laval Separation Inc., Warminster, Pa). Seven point seven pounds of the first protein composition solids was recovered with 76.0% dry basis Kjeldahl protein, 17.5% dry basis acid hydrolyzed fat and a protein to fat ratio of 4.3 to 1.

EXAMPLE 3

Preparation of Reduced-Fat Hemp Protein Compositions and Hemp Cream From Milled Hemp Seeds Milled hemp seeds were obtained from Manitoba Harvest, Winnipeg, Manitoba, Canada and the milled hemp seeds contained 5.8% moisture, 33.4% dry basis Kjeldahl protein, 45.1% dry basis acid hydrolyzed fat and a 0.74 to 1 protein to fat ratio.

Fifty pounds of the hemp seed was mixed with 320 pounds of water at 125° F. in a 50 gallon agitated tank. The hemp slurry was continuously recirculated from the tank to a colloid mill and back into the tank at a rate of 5 gallons per minute for 30 minutes to wet mill the seeds. One hundred sixty pounds of additional water was added to the slurry, and the pH of the extraction slurry was adjusted to 7.5 with the addition of a 10% solution of sodium hydroxide (50% solution, Fisher Scientific, Barnstead International, Dubuque, IA). The diluted slurry was held for a mean time of 20 minutes. The extract was separated from the insoluble by-product using a high g-force, disk-type clarifying centrifuge (model SB-7, Westfalia Separator Industry GmbH, Oelde, Germany) at an extract flow rate of 3.3 to 6.6 pounds per minute with intermittent solids discharge of 2 second duration on a 7 minute cycle. Twenty one point eight pounds of insoluble by-product was collected and discarded at 27.25% solids, 30.9% Kjeldahl dry basis protein.

The extract was heated to 130° F. and delivered to a high g-force continuous discharge, disk-type separator (model MP-1254, Westfalia Separator Industry GmbH, Oelde, Germany) for separation of the fat-enriched hemp cream fraction. The separator was fed at a rate of 12 pounds per minute, separating the fat-enriched fraction from the reduced-fat extract. Ninety four point nine percent of the fat in the extract was removed. The reduced-fat extract, contained a protein to fat ratio of 9.5 to 1, and had a proximate value of 79.0% Kjeldahl dry basis protein and 8.3% dry basis acid hydrolyzed fat. The fat-enriched fraction, also known as hemp cream had a composition as identified in Table 4, and was further processed as described in Example 7.

The reduced-fat extract was then precipitated by adding citric acid powder to a pH of 4.4 in an agitated tank at 130° F. The mixture was held for 30 minutes with mild agitation, and then fed continuously to a high g-force disk-type clarifying centrifuge (model SB-7, Westfalia Separator Industry GmbH, Oelde, Germany). Seven point four pounds of first protein composition was recovered with 91.6% dry basis Kjeldahl protein, 11.0% dry basis acid hydrolyzed fat and a protein to fat ratio of 8.3 to 1.

The second protein composition was modified by adjusting the solids level to 10.1% with fresh water at 90° F., and adjusting the pH to 6.8 with a 10% solution of sodium hydroxide. The neutralized slurry was then spray dried in a NIRO (Hudson, WI) model 1 spray-drier with 200° C. inlet and 92° C. outlet to produce a hemp protein isolate powder with 3.6% moisture. The hemp protein isolate powder was analyzed for its functional properties as described in Examples 9 and 10.

EXAMPLE 4

Preparation of Reduced Fat Sunflower Protein Products From Raw Sunflower Seed

Raw sunflower kernels (SL80) were obtained from Dakota Gourmet (SunOpta, Wahpeton, ND). The raw sunflower kernels were ground with a grinding mill (All-Grain-Company model A-22, Brigham City, Utah) into a 100 mesh sunflower flour. The sunflower flour had proximate analysis of 4.4% moisture, 27.3% dry basis Kjeldahl protein, 57.7% dry basis acid hydrolyzed fat and a 0.47 to 1 protein to fat ratio.

One hundred grams of sunflower flour was mixed with 1.2 liters of water at 145° F. in a 2 liter agitated beaker. The pH of the extraction slurry was adjusted to 8.8 by using a 50% calcium hydroxide solution and held for a mean time of 1 hour. The extract was separated from the insoluble by-product using a high g-force, International Equipment Company model K lab centrifuge at 4000 rpm for 10 min. The insoluble by-product was collected and contained 20.78% solids and 46.3% Kjeldahl dry basis protein.

The extract was reheated to 130° F. delivered to a milk centrifugal separator (Hemdhenu Ekectric cream separator type KD-60E, India) for separating the fat-enriched fraction from the reduced-fat extract. Seventy three percent of the fat in the extract was removed in the sunflower cream. The reduced-fat extract, contained a protein to fat ratio of 8.5 to 1 with a 69.0% Kjeldahl dry basis protein and 8.1% dry basis acid hydrolyzed fat.

The reduced-fat extract was precipitated by adding a 50% citric acid solution to a pH of 4.0 in an agitated beaker at 140° F. The mixture was held for ten minutes with mild agitation, and then centrifuged as identified in this Example to separate the curd (precipitated protein) from the whey. The recovered curd, also known as the first plant protein composition, represented a sunflower protein concentrate with 84.8% dry basis Kjeldahl protein and 9.7% dry basis acid hydrolyzed fat. The protein to fat ratio of the first protein composition was 8.7 to 1.

EXAMPLE 5

Preparation of Reduced-Fat Peanut Protein Compositions and Peanut Cream From Full Fat Peanut Meal Full fat peanut meal was obtained from American Health & Nutrition (Misc. # ZPEMAHN6). The peanut meal had proximate analysis of 4.92% moisture, 31.5% dry basis Kjeldahl protein, 49.5% dry basis acid hydrolyzed fat and a 0.63 to 1 protein to fat ratio.

One hundred grams of peanut meal were extracted with 1.2 liters of water at 140° F. in a 2 liter agitated beaker. The pH of the extraction slurry was adjusted to 7.3 by using a 50% calcium hydroxide solution and held for a mean time of 30 minutes. The extract was separated from the insoluble by-product using a high g-force, lab centrifuge identified in Example 4 at 4000 rpm for 10 min. The insoluble by-product was collected and contained 22.7% solids and 22.7% Kjeldahl dry basis protein.

The extract was reheated to 160° F. delivered to a milk centrifugal separator identified in Example 4 for separating the peanut cream (fat-enriched fraction) from the reduced-fat extract. Eighty percent of the fat in the extract was removed in the peanut cream. The reduced-fat extract contained a protein to fat ratio of 7.0 to 1 with a 78.7% Kjeldahl dry basis protein and 11.2% dry basis acid hydrolyzed fat. The fat-enriched fraction, also known as peanut cream had a composition as identified in Example 7.

The reduced-fat extract was precipitated by adding a 50% citric acid solution to a pH of 4.4 in an agitated beaker at 140° F. The mixture was held for ten minutes with mild agitation, and then centrifuge as in Example 4 to separate the curd (precipitated protein) from the whey. The recovered curd, also known as the first plant protein composition, represented a peanut protein isolate with 90% dry basis Kjeldahl protein and 8% dry basis acid hydrolyzed fat. The protein to fat ratio of the first protein composition was 11.25 to 1.

EXAMPLE 6

Preparation of Reduced-Fat Sesame Protein Compositions and Sesame Cream From Full Fat Sesame Meal Full fat sesame meal was obtained from American Health & Nutrition (Misc. # ZSMMAHN6). The sesame meal had proximate analysis of 5.0% moisture, 28.4% dry basis Kjeldahl protein, 51.5% dry basis acid hydrolyzed fat and a 0.55 to 1 protein to fat ratio.

One hundred grams of sesame meal were extracted with 42.3 ounces of water at 140° F. in a 2 liter agitated beaker. The pH of the extraction slurry was adjusted to 7.3 by using a 50% calcium hydroxide solution and held for a mean time of 30 minutes. The extract was separated from the insoluble by-product using a high g-force, lab centrifuge as identified in Example 4 at 4000 rpm for 10 min. The insoluble by-product was collected and contained 30.44% solids and 30.1% Kjeldahl dry basis protein.

The extract was reheated to 160° F. delivered to a milk centrifugal separator as identified in Example 4 for separating the sesame cream (fat-enriched fraction) from the reduced-fat extract. Seventy seven percent of the fat in the extract was removed in the sesame cream producing a reduced-fat extract. The reduced-fat extract, contained a protein to fat ratio of 2.8 to 1 with a 45.9% Kjeldahl dry basis protein and 16.5% dry basis acid hydrolyzed fat. The fat-enriched fraction, also known as sesame cream had a composition as identified in Examples 7 and 8.

The reduced-fat extract was precipitated by adding a 50% citric acid solution to a pH of 4.4 in an agitated beaker at 140° F. The mixture was held for ten minutes with mild agitation, and then centrifuged as in Example 4 to separate the curd (precipitated protein) from the whey. The recovered curd, also known as the first plant protein composition, represented a rich sesame protein product with 62% dry basis Kjeldahl protein and 0% dry basis acid hydrolyzed fat. The protein to fat ratio of the first protein composition was 62 to 1. The separated whey of the sesame was surprisingly high in residual fat content, and the protein compositions had almost no fat.

EXAMPLE 7

Analysis of the Fat-Enriched Fractions and Preparation of Degummed Oils and Non-Soy Lecithin From the Fat-Enriched Fraction of the Fat Separation Process Three fat-enriched cream fractions from Examples 1, 2, and 3 were collected from the fat separation process. The cream samples were then freeze dried to a powder in an FTS Systems Dura-Top bulk tray freeze drier for 48 hours to produce a crude oil by removing the water. The freeze dried crude oil was heated to 158° F. and agitated. Two percent of a five percent citric acid solution was added to the agitated freeze-dried crude oil for additional mixing of 15 minutes. The hydratable phospholipids and gums were then removed by centrifugation at 4000 rpm for 10 minutes, and the oil was filtered over filter paper.

The degummed oils and the gums fractions (lecithin) were then analyzed for their chemical compositions as delineated below. The free fatty acid value indicates the amount of hydrolytic rancidity that has occurred in a fat based on the two following official methods of analysis: (1) AOAC method 41.1.21 and (2) Official Methods and Recommended Practices of the American Oil Chemists Society, 5th Ed., Method Ca 5a-40 each of which is incorporated herein by reference in their entirety. Hydrolytic rancidity is caused by enzyme hydrolysis of fats into free fatty acids and glycerol. The test involves dissolving a fat sample in organic solvent and titrating with sodium hydroxide. Free fatty acid can be expressed in terms of an acid value instead of percent free fatty acids. The acid value is defined as mg of potassium hydroxide (KOH) necessary to neutralize one gram of sample. To convert percent free fatty acids (as oleic) to an acid value, multiply the percent free fatty acids by 1.99.

The mineral content of the crude oil, the degummed oil and the gums was determined using standard methods such as the following: AOAC 18th Ed. Method 985.35, Minerals in ready to Feed Milk Based Infant Formula, 1997, Standard Methods for the Examination of Water & Waste Water, Method 3111, Metals by Atomic Absorption Spectrophotometry, 1999, and AACC 10th Ed. Method 40-71, Sodium and Potassium by Atomic Absorption Spectrophotometry, 1999 each of which is incorporated herein by reference in its entirety.

The levels of acetone insoluble matter present in the soy gums were determined using the following method. The gums were warmed briefly at a temperature not exceeding 60° C. and then mixed. Two grams were transferred to a 40-mL centrifuge tube and 15.0 mL of acetone was added. The resulting sample was warmed in a water bath with stirring to melt the gums completely and then placed in an ice-water bath for 5 minutes. Acetone chilled to between 0° and 5° C. was then added to the 40-mL mark on the centrifuge tube with stirring. The tube was then incubated in an ice-water bath for 15 minutes, stirred, and centrifuged at 2000 rpm for 5 minutes. The supernatant was decanted and the pellet broken up. The centrifuge tube was then refilled with chilled acetone to the 40 mL mark while stirring. After incubation in an ice-water bath for 15 minutes, the tube was centrifuged again, the supernatant was decanted and the remaining acetone was allowed to evaporate. The tube containing the acetone-insoluble residue was heated to 105° C. and the weight of the acetone insoluble residue determined. The percentage of acetone-insoluble matter can then be calculated by comparison to the starting weight.

TABLE 1

| CRUDE OIL COMPARISONS | | | |
|---|---|---|---|
|  | % FAT | % PROTEIN | % OTHER dry basis |
| CRUDE CANOLA OIL | 95.50% | 2.40% | 2.10% |
| CRUDE SUNFLOWER OIL | 94.00% | 4.90% | 1.10% |
| CRUDE HEMP OIL | 92.80% | 1.50% | 5.70% |

TABLE 2

| DEGUMMED OIL COMPARISONS | | | | | |
|---|---|---|---|---|---|
|  | % FAT | % PROTEIN | % OTHER dry basis | PHOSPHOROUS mg per 100 grams | FREE FATTY ACIDS acid value |
| DEGUMMED CANOLA OIL | 99.60% | 0.01% | 0.39% | <3.0 | 1.340 |
| DEGUMMED SUNFLOWER OIL | 98.90% | 0.01% | 1.09% | 1.67 | 0.460 |
| DEGUMMED HEMP OIL | 99.80% | 0.01% | 0.19% | <1.5 | 1.920 |

TABLE 3

GUMS

| | % FAT | % PROTEIN | % OTHER dry basis | PHOSPHOROUS mg per 100 grams | ACETONE INSOLUBLES |
|---|---|---|---|---|---|
| CANOLA GUMS | 76.30% | 18.30% | 5.40% | 294 | 26.50% |
| SUNFLOWER GUMS | 46.40% | 49.40% | 4.20% | 932 | 58.50% |
| HEMP GUMS | 88.50% | 9.70% | 1.80% | 110 | 17.05% |

The oil fractions of these processes may be refined, bleached, deodorized, winterized, or undergo any further processing to purify the oil from the fat-enriched fraction. The precipitated gums can be used as a feed additive, or evaporated to remove moisture. The gums have various uses such as a food emulsifier.

EXAMPLE 8

Comparison of Cream Compositions Obtained From Fat Separation of Grains

Creams obtained from Examples 1 through 6 were analyzed for their composition including a fatty acid profile as shown in the table below. The fatty acid composition, the total saturated and the total unsaturated fat in the various cream samples was determined using standard methods. Fat and fatty acids were extracted by hydrolytic methods; the fat was extracted into ether, saponified, and then methylated to fatty acid methyl esters (FAMES). FAMES were then quantitatively measured by capillary gas chromatography. The procedure is based on the two following official methods: (1) *AOAC* 18*th Edition, Method* 996.06, *Fat* (*Total, Saturated and Unsaturated*) *in Foods,* 2001, and (2) AOCS, 5*th Ed., Method Ce* 2-66, *Preparation of Methyl Esters of Fatty Acids,* 199, each of which is incorporated by reference in its entirety.

TABLE 4

CREAM COMPOSITION

| | EXAMPLE | | | | |
|---|---|---|---|---|---|
| | 1 | 2 | 3 | 5 | 6 |
| | GRAIN | | | | |
| | CANOLA | SUNFLOWER | HEMP | PEANUT | SESAME |
| % FAT REMOVED FROM EXTRACT | 90% | 76% | 95% | 80% | 77% |
| CREAM DRY BASIS COMPOSITION | | | | | |
| FAT | 95.5% | 95.8% | 97.7% | 91.1% | 90.5% |
| PROTEIN | 2.5% | 3.8% | 1.9% | 7.5% | 4.6% |
| OTHER | 2.0% | 0.4% | 0.3% | 1.4% | 4.9% |
| FATTY ACID COMPOSITION | | | | | |
| C16:0 PALMITIC | 3.7% | 3.2% | 5.0% | 7.7% | 9.3% |
| C18:0 STEARIC | 2.2% | 3.3% | 3.3% | 2.4% | 5.3% |
| C18:1 OLEIC | 65.4% | 81.8% | 12.9% | 61.0% | 36.8% |
| C18:2 LINOLEIC | 18.1% | 9.2% | 55.5% | 20.1% | 46.3% |
| C18:3 LINOLENIC | 7.2% | 0.2% | 20.0% | 0.1% | 0.5% |
| % SATURATED | 7.2% | 8.0% | 9.3% | 15.8% | 15.1% |
| % MONOUNSATURATED | 64.2% | 78.7% | 12.8% | 60.4% | 35.6% |
| % POLYUNSATURATED | 24.3% | 9.0% | 73.4% | 19.4% | 44.8% |
| % TRANS FAT | 0.1% | 0.1% | 0.2% | 0.2% | 0.2% |
| % OMEGA 3 FAT | 6.8% | 0.2% | 15.6% | 0.1% | 0.5% |

The fat separation process removed 76% to 95% of the fat present in the extract in all grains tested, and the cream samples contained a cream composition of 90% to 97% fat. The cream sample fatty acid profiles are very similar in composition to the data reported in American Oil Chemists Society publication Official Methods and Recommended Practices of the AOCS, Physical and Chemical Characteristics of Oils, Fats, and Waxes, 2nd Edition for oil from the same seed source.

EXAMPLE 9

Comparison of the Protein Compositions for Examples 2 Through 6

A comparison of the protein compositions produced in Examples 1 through 6 is provided below. The centrifugal fat separation method resulted in an increase in the protein to fat ratio in each of the Examples.

TABLE 5

FIRST PROTEIN COMPOSITION ANALYSIS

| | EXAMPLE | | | | | |
|---|---|---|---|---|---|---|
| | 1 | 2 | 3 | 4 | 5 | 6 |
| | | | GRAIN | | | |
| PROTEIN COMPOSITION | CANOLA | SUNFLOWER | HEMP | SUNFLOWER | PEANUT | SESAME |
| PROTEIN, % DRY BASIS | 51.10% | 76.0% | 91.6% | 84.8% | 90.0% | 62.0% |
| FAT, % DRY BASIS | 6.70% | 17.5% | 11.0% | 9.7% | 8.0% | 0.0% |
| OTHER, % DRY BASIS | 42.2% | 6.5% | −2.6% | 5.5% | 2.0% | 38.0% |
| PROTEIN/FAT RATIO | 7.6 | 4.3 | 8.3 | 8.7 | 11.3 | 62 |

EXAMPLE 10

RVA Viscosity Analysis of Hemp Protein Isolate Produced in Example 3

The viscosity of the soy protein material was determined by an RVA viscosity analysis in 20% slurry solution, using a Rapid Visco Analyzer (RVA). The 20% solution is prepared by mixing the soy protein materials with water at 25° C. using a Combimax 600 food processor (Braun Boston, Ma) for a period of time sufficient to permit the formation of a shiny, smooth slurry. Twenty-five grams of the homogenous solution was then placed into a canister with a paddle and delivered into a Rapid Visco Analyzer (RVA-4, Newport Scientific Pty Ltd, Warriewood, Australia). The RVA was used to continuously measure the apparent viscosity of the slurry. The total test time in the RVA was 17 minutes and 30 seconds. The slurry was held at 25° C. for the first three minutes followed by heating to 95° C. over the next 4 minutes. The slurry was held at 95° C. for 2 minutes and 30 seconds and then cooled back to 25° C. over the next 6 minutes and finally held at 25° C. for 2 more minutes. During the heating, holding and cooling process in the RVA, the slurry was mixed at 160 rpm. From the apparent viscosity curve three points were determined for comparison tests. The minimum cold viscosity of the sample describes the minimum initial viscosity at 25° C., the minimum hot viscosity describes the minimum viscosity at 95° C., and the maximum set-up viscosity describes the peak viscosity after cooling the sample back to 25° C.

Hemp protein isolate produced in Example 3 was analyzed by the RVA procedure, and a soy protein isolate for low viscosity applications available from Solae (Supro 590, St. Louis, MO) was used for comparison purposes. The results are shown in Table 6.

TABLE 6

| | RVA ANALYSIS | | |
|---|---|---|---|
| Product | RVA Min Cold viscosity | RVA Min Hot viscosity | RVA Max set-up Viscosity |
| Hemp Protein | 0 | 0 | 702 |
| Solae 590 | 2801 | 2682 | 4978 |

The hemp protein isolate has significantly lower viscosities than the commercial product marketed for product applications where low viscosity is desired such as in liquid and dry blend beverages.

What is claimed is:

1. A reduced-fat non-soy plant extract consisting of 5% to 15% plant fat by weight, at least about 45% to 85% dry weight plant protein, and a plant protein to fat ratio of at least 7:1 based on the 5% to 15% plant fat by weight and at least about 45% to 85% dry weight plant protein, wherein the reduced-fat non-soy plant extract is free of hexane or alcohol, and wherein the reduced-fat non-soy plant extract is derived from a non-soy plant material.

2. The reduced-fat non-soy plant extract of claim 1, wherein the plant protein to fat ratio is at least 12 to 1.

3. A food product containing the reduced-fat non-soy plant extract of claim 1.

4. The food product of claim 3, wherein the food product is a confectionary product, a bakery product, an injection meat product, an emulsified meat product, a ground meat product, a meat analog product, a cereal, a bar, a dairy analog product, a beverage, a non-soy plant milk, a liquid or powdered dietetic formula, a texturized plant product, a pasta, a health nutrition supplement, or a nutrition bar.

5. A composition comprising a reduced-fat non-soy plant extract consisting of 5% to 15% plant fat by weight, at least about 45% to 85% dry weight plant protein, and a plant protein to fat ratio of at least 7:1 based on the 5% to 15% plant fat by weight and at least about 45% to 85% dry weight plant protein, wherein the composition is free of hexane or alcohol, wherein the non-soy plant extract is derived from a non-soy plant material.

6. The composition of claim 5, wherein the non-soy plant material is selected from the group consisting of canola, pumpkin, corn, peanuts, sunflower, rice bran, and hemp.

7. The composition of claim 5, wherein the reduced-fat non-soy plant composition consists of at least about 65% to 85% dry weight plant protein.

8. The composition of claim 5, wherein the plant protein to fat ratio is at least 12 to 1.

9. A food product containing the reduced-fat non-soy plant composition of claim 5.

10. The food product of claim 9, wherein the food product is a confectionary product, a bakery product, an injection meat product, an emulsified meat product, a ground meat product, a meat analog product, a cereal, a bar, a dairy analog product, a beverage, a non-soy plant milk, a liquid or powdered dietetic formula, a texturized plant product, a pasta, a health nutrition supplement, or a nutrition bar.

11. The reduced-fat non-soy plant extract of claim 1, wherein the non-soy plant material is selected from the group consisting of canola, pumpkin, corn, peanuts, sunflower, rice bran, and hemp.

12. A reduced-fat non-soy plant extract consisting of plant protein, plant fat, and a solvent, wherein the solvent consists essentially of an aqueous solution, wherein the reduced-fat non-soy plant extract has 5% to 15% plant fat by weight, at least about 45% to 85% dry weight plant protein, and a plant protein to fat ratio of at least 7:1 based on the 5% to 15% plant fat by weight and at least about 45% to 85% dry weight plant protein.

13. A composition containing the reduced-fat non-soy plant extract of claim 12.

14. The composition of claim 13, wherein the reduced-fat non-soy plant composition consists of at least about 65% to 85% dry weight plant protein.

15. A reduced-fat non-soy plant extract consisting of 5% to 15% plant fat by weight, at least about 45% to 85% dry weight plant protein, and a plant protein to fat ratio of at least 3:1 based on the 5% to 15% plant fat by weight and at least about 45% to 85% dry weight plant protein, wherein the reduced-fat non-soy plant extract is free of hexane or alcohol, and wherein the non-soy plant extract is derived from non-soy plant material selected from the group consisting of canola, pumpkin, corn, sunflower, rice bran, and hemp.

16. A food product containing the reduced-fat non-soy plant extract of claim 15.

17. The food product of claim 16, wherein the food product is a confectionary product, a bakery product, an injection meat product, an emulsified meat product, a ground meat product, a meat analog product, a cereal, a bar, a dairy analog product, a beverage, a non-soy plant milk, a liquid or powdered dietetic formula, a texturized plant product, a pasta, a health nutrition supplement, or a nutrition bar.

18. A composition containing the reduced-fat non-soy plant extract of claim 15.

19. The composition of claim 18, wherein the plant protein to fat ratio is at least 4 to 1.

* * * * *